455-603 AU 233 EX
FIP8106 XR 3,534,351

Oct. 13, 1970 J. D. HARNDEN, JR., ETAL 3,534,351

LIGHT COUPLED BATTERY POWERED REMOTE CONTROL APPARATUS

Filed April 7, 1967 3 Sheets-Sheet 1

Inventors:
Clifford M. Jones,
John D. Harnden, Jr.
Donald L. Watrous,
by Donald R. Campbell
Their Attorney.

Inventors:
Clifford M. Jones,
John D. Harnden, Jr.
Donald L. Watrous,
by Donald R. Campbell
Their Attorney.

Oct. 13, 1970 J. D. HARNDEN, JR., ETAL 3,534,351

LIGHT COUPLED BATTERY POWERED REMOTE CONTROL APPARATUS

Filed April 7, 1967 3 Sheets-Sheet 3

Inventors:
Clifford M. Jones,
John D. Harnden, Jr.
Donald L. Watrous,
by Donald R. Campbell
Their Attorney.

United States Patent Office 3,534,351
Patented Oct. 13, 1970

3,534,351

LIGHT COUPLED BATTERY POWERED REMOTE CONTROL APPARATUS

John Davis Harnden, Jr., and Donald Leland Watrous, Schenectady, N.Y., and Clifford Morgan Jones, Waynesboro, Va., assignors to General Electric Company, a corporation of New York Filed Apr. 7, 1967, Ser. No. 629,262
Int. Cl. G08b *17/10*
U.S. Cl. 340—237 1 Claim

ABSTRACT OF THE DISCLOSURE

Battery powered transmitter and receiver units for remote control apparatus requiring minimum power are coupled by narrow intense constant frequency light pulses from a light emitting semiconductor diode produced by a two-transistor relaxation oscillator. The receiver output indication is in response to an absence of pulses or possibly to each pulse. Exemplary remote control devices are: intrusion alarm, smoke detector, photoelectric relay, cordless clock.

This invention relates to light coupled remote control apparatus which are battery operated and have low energy requirements, and more particularly to such apparatus where the light coupling is by means of injection luminescence or light emitting semiconductor diodes operated in pulsed mode.

For certain remote control application, it would be desirable to have a relatively simple and inexpensive transmitter-receiver apparatus which is trouble-free, easily installed and operable over long periods of time without attention. These requirements can be satisfied by battery powered remote control devices designed to operate on ordinary batteries or other available low energy sources of electric potential. With battery operated circuits chosen to use minimum power so as to approach the shelf life of the batteries, significant product advantages could be obtained such as reduced cost, increased portability, and ease of installation. Two important characteristics of the light emitting semiconductor diode, low impedance, and fast response, make it suitable for use as a light coupling in such remote control applications. The light emitting diode is applied in a wide range remote control system data link as described in application Ser. No. 461,231, now Pat. No. 3,488,586, filed June 2, 1965 by John D. Harnden, Jr., and Donald L. Watrous, and assigned to the same assignee as the present invention. In this control system, however, analog data is sensed and converted to a variable frequency rate for causing the light emitting diode to emit light pulses at a variable rate, and the receiver converts the sensed pulses back to an analog value. While these circuits can be battery powered, they do not use extremely low power levels so as to be operable on batteries over an extended period of time and are for a different type of application requiring circuitry for dealing with continuous data.

Accordingly, an object of the invention is to provide new and improvea low energy battery supplied remote control apparatus wherein the transmitter and receiver units use extremely low power and are coupled by light from a light emitting diode operated in pulse mode at a substantially constant or predetermined frequency.

Another object is to provide generally improved remote control devices of the foregoing type as exemplified for example in an intrusion alarm, a smoke detector, a photoelectric relay, and a light-operated cordless clock.

In accordance with the invention, a low energy remote control apparatus comprises a light transmitter unit powered by a low energy source of electric potential, preferably a low voltage battery, and includes pulse forming circuit means having low energy requirements for generating a series of electrical pulses at a substantially constant frequency rate when time averaged over a predetermined period of time and wherein the spacing between the pulses is relatively long compared to the width of the pulses. A light emitting semiconductor device is coupled to the output of the pulse forming circuit means for producing a corresponding series of narrow intense light pulses at the substantially constant frequency rate. A receiver unit is spaced from the transmitter and is also powered by a low energy source of electric potential such as a battery. The receiver further comprises electro-optical sensor means optically coupled to the light emitting semiconductor device for sensing the series of transmitted light pulses, and associated means for deriving an electrical control signal which has a first value when the light pulses are sensed at the substantially constant frequency rate and a second value when the optical coupling is broken and the transmitted light pulses are not received for a predetermined period of time. An output indicator is operated by the second value of the control signal for signalling a control function. In an intrusion alarm and a smoke detector, the output indicator is for instance an electro-acoustical or electro-optical transducer, while in the photoelectric relay the contacts are opened to provide an output indication.

The foregoing and other objects, features, and advantages of the invention will be apparent from the following more particular description of the several preferred embodiments of the invention, as illustrated in the accompanying drawings wherein.

Figure 2:
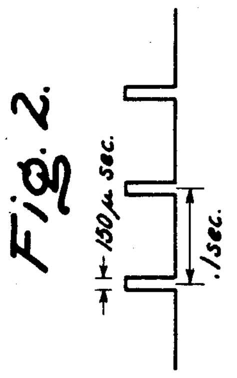
FIG. 2 is a plot of a series of constant frequency light pulses produced by the transmitter unit of FIG. 1.

The injection luminescence or light emitting semi-conductor diode (LED) is a PN junction diode which emits light when biased in the forward direction. One basic type produces coherent light at liquid nitrogen temperatures or when pulsed at room temperatures, while the other basic type produces non-coherent light. The light emitting diode of primary interest in this application operates at normal room temperatures (about 25° C.) and emits non-coherent light or pulsed coherent light. According to present forecasts, the price of such light emitting diodes is expected to decrease considerably in the coming years so that they will be relatively inexpensive, and they can further be readily miniaturized and made sufficiently rugged for both military and industrial applications. The light emission produced when the device is stimulated by a direct current electrical signal occurs at different regions of the infrared and visible spectrum according to the material of which the particular device is fabricated. A gallium arsenide device will emit light in the near infrared region at about 9000 angstroms when operated at normal room temperature. A gallium arsenide-gallium phosphide device emits visible light in the red-orange region near 7700 angstroms when operated at a case temperature of 25° C. Light emitting diodes which produce infrared and visible light at other regions of the spectrum are also available.

There are several inherent advantages of the solid state LED light source as compared to conventional light sources. One advantage is the very fast response time, as the rise and fall times of LED light sources measure in the fraction microsecond range. The impedance of the forward-biased LED is similar to that of an ordinary silicon power diode, and this low impedance is compatible with low voltage power supplies and semiconductor circuits. The monochromatic nature of the light output, even for the non-coherent types, means that optical filtering can be applied efficiently if and when it might be needed, and that light sensors can be efficient since they need only light in a relatively narrow band width. Further, the long life and mechanical ruggedness lead to greatly improved reliability.

Two of these characteristics, low impedance and fast response, are particularly siutable for battery powered applications. The LED remote control applications herein discussed make use of the fast response of the LED by use of pulse techniques. Pulsed operation provides the high current useful with the LED, in the neighborhood of one ampere for the circuits discussed, while allowing low overall power drain and device dissipation by the use of low duty cycle. Pulsed operation permits maximum light output while keeping the semiconductor junction cool. Pulsed operation also permits simple high frequency pass filtering in the receiver which permits rejection of other relatively low frequency light signals which might otherwise interfere with the operation of the system. With the combination of the low impedance light emitting diode operated in pulse mode by pulse generating circuity having extremely low power requirements, it is possible to operate remote control equipment continuously over relatively long periods of time powered by readily obtainable inexpensive low voltage dry cells in the range of about 1.5 to 3 volts limited only by the shelf life of the battery power supply.

Figure 1:
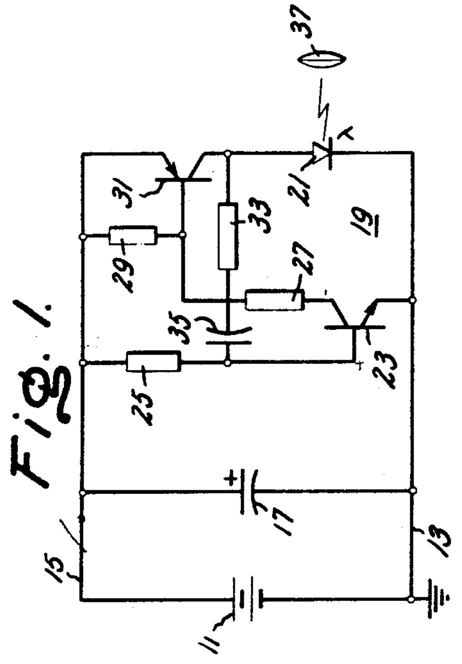
FIG. 1 is a schematic circuit diagram of a light transmitter unit for an intrusion alarm device.
Figure 3:
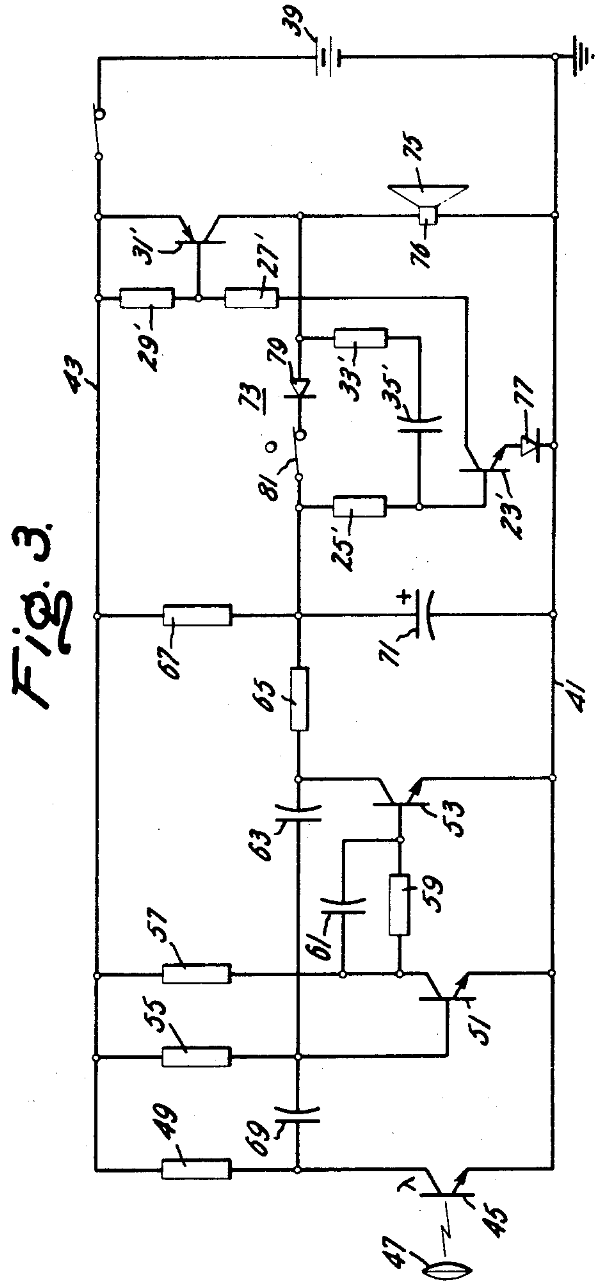
FIG. 3 is a schematic circuit diagram of a receiver unit for the intrusion alarm.

The remote control apparatus illustrated in FIGS. 1–3 is an intrusion alarm device comprising a light transmitter unit which produces a series of light pulses at a frequency of about 10 per second which are detected by a receiver unit. When an intruder passes between the transmitter and receiver units, the train of light pulses is broken and an alarm is sounded in the receiver unit. The light transmitter (FIG. 1) is powered by a low voltage battery 11 which preferably comprises two series connected 1.5 volt carbon-zinc dry cells, more commonly known as size D flashlight batteries. The negative supply terminal 13 is grounded, and the positive supply terminal 15 is then at +3 volts. A charging capacitor 17 is connected between the power supply terminals 13 and 15 and is charged by the battery 11 to the indicated polarity. Also connected between the battery supply terminals 13 and 15 is a high efficiency pulse generator 19 for deriving a series of electrical pulses at a constant or substantially constant frequency rate and wherein the spacing of the pulses is relatively long compared to the width of the pulses. The series of electrical pulses are applied to a light emitting semiconductor diode 21 connected between the output of the pulse generator 19 and the gounded supply terminal 13, thereby producing a corresponding train of light pulses at the constant frequency rate. In this manner the LED operated on a time ratio basis to sample the data (an uninterrupted light path) with good fidelity while using very little power.

The pulse forming circuit 19 is a relaxation oscillator comprising two cross coupled complementary transistors wherein the high efficiency of the circuit is possible because both of the transistors are normally in the off condition. A first transistor 23 is an NPN junction transistor having its emitter connected to the grounded supply terminal 13 and its base coupled through a charging resistor 25 to the positive supply terminal 15. The collector of transistor 23 is connected to a voltage divider comprising series connected resistors 27 and 29 which is in turn coupled to the positive supply terminal 15. The junction of the resistors 27 and 29 is connected to the base electrode of a second transistor 31, which is a PNP junction transistor having its emitter connected directly to the positive supply terminal 15 while its collector, which is the output of the relaxation oscillator, is connected to the anode of the light emitting diode 21. The collector of the second transistor 31 is also coupled back to the base of the first transistor 23 through the series combination of a charging resistor 33 and a timing capacitor 35.

The operation of the pulse generator or pulse forming circuit 19 is as follows. When the battery 11 is first connected in, the base of transistor 23 is at 0 volt and is rising at a rate determined primarily by the time constant of the RC charging network comprising the resistor 25 and the capacitor 35. When the base of transistor 23 is sufficiently positive, the transistor 23 turns on, and there is current flow through the voltage dividing network provided by the resistors 27 and 29. The base emitter junction of the second transistor 31 is now forward biased, and the transistor 31 turns on. The current pulse produced is supplemented by current provided by the discharging of the capacitor 17 and turns on the LED 21. A portion of the collector current also flows through the charging resistor 33 and charges the timing capacitor 35 at a rate determined primarily by the time constant of this RC charging network. As the capacitor 35 becomes fully charged toward the potential of the positive supply terminal 15, base current for the first transistor 23 decreases until the transistor 23 starts to turn off, and this causes the second transistor 31 to turn off also. The base electrode of the first transistor 23 remains reversed biased by the negative potential on the adjacent plate of the timing capacitor 35, which decays at a rate determined by the time constant of charging resistor 25 and capacitor 35. The on-time of the second transistor 31 and thus the pulse width supplied to the light emitting diode 21 is network comprising the resistor 33 and the capacitor 35, while the off time is determined by the time constant of the RC charging network comprising the resistor 25 and capacitor 35. Since the capacitor 35 is common to each, the off-on ratio then is dependent on the ratio of the magnitude of resistor 25 to that of resistor 33. This ratio can be made very large. As both of the transistors 23 and 31 are off simultaneously for the majority of the time, circuit efficiency is determined primarily by the leakage current of the second transistor 31.

For typical component values which will be given later, this pulse generating circuit applies nominally one ampere current pulses to the LED 21 at a repetition rate of about 10 pulses per second. As is shown in FIG. 2 the pulses have fast rise and fall times and the pulse width of the individual pulses is about 150 microseconds. The base-emitter impedance of the first transistor 23 limits the minimum pulse width obtainable with a given set of constants for this particular circuit to a pulse width of 50 microseconds. While the shorter pulses would be desirable from the standpoint of lower over-all power consumption, the characteristics of the light sensor in the receiver unit limits the minimum pulse width that can be used. The transmitter circuit having the following component values can be powered by two 1.5 volt flashlight batteries, and requires only 0.7 milliampere. Operating on less than 10 milliwatts of power permits long life battery powered operation, and with minor modifications particularly using new detectors and MOS-FET transistors it appears feasible that very nearly ordinary flashlight battery shelf life can be obtained. Component values for the FIG. 1 circuit are as follows:

Transistor 23—GE type 2N2712
Transistor 31—GE type 2N404
LED 21—TI type SNX–100

Resistor 25—330K ohms
Resistor 27—22 ohms
Resistor 29—100 ohms
Resistor 33—10 ohms
Capacitor 17—500 microfarads
Capacitor 35—0.17 microfarad A minor modification that can be made to this circuit to stabilize the current pulse at some particular value is to add a small resistor in the emitter lead of the second transistor 31. A small resistor can also be inserted in the base lead of the first transistor 23, between the base electrode and the juncture of resistor 25 and capacitor 35.

For this application in an intrusion alarm, the LED 21 is preferably one which produces infrared light emission so as to be invisible at night. Desirably the light output from the LED 21 is collected and focused by a lens 37. A convenient arrangement is provided by mounting the light emitting diode in an adjustable focus type light source holder, such as that marketed by the Farmer Electric Products Company, Inc. of Natick, Mass.

The receiver unit shown in FIG. 3 is also powered by a low voltage battery and has extremely low power requirements. The receiver unit senses the train of light pulses from the transmitter unit, stretches the received pulses and sounds an alarm if pulses are not received for a predetermined time. The battery source 39 is preferably provided by two 1.5 volt carbon-zinc dry batteries connected in series and, as for the transmitter unit, the negative supply terminal 41 is grounded while the positive supply terminal 43 is at +3 volts. The electro-optical device for sensing the light pulses takes the form of a phototransistor 45, although equivalent light activated semiconductor devices such as photodiodes, photoresistors, or silicon solar cells can of course be used. The phototransistor 45 may be a planar silicon photodevice such as the type LS-400 NPN planar silicon phototransistor marketed by Texas Instruments, Inc. A lens 47 is provided to collect and forcus the light from the light emitting diode onto the light sensitive junction of the phototransistor 45. A negative voltage pulse is produced at the collector of the phototransistor 45 when it is turned on by reception of a light pulse. The emitter of the phototransistor 45 is connected to ground while its collector is connected through a resistor 49 to the positive supply terminal 43.

The received pulses are stretched in a one-shot multivibrator circuit comprising two identical NPN transistors 51 and 53. The base of the transistor 51 is coupled through a resistor 55 to positive supply terminal 43, the emitter electrode is grounded, and the collector is connected to positive supply terminal 43 through a resistor 57. The collector of transistor 51 is also RC coupled to the base of the transistor 53 by the parallel combination of resistor 59 and capacitor 61. The emitter electrode of transistor 53 is grounded, and its collector electrode is connected in a feedback path to the base of the transistor 51 through a coupling capacitor 63, as well as being connected by means of series resistors 65 and 67 to the positive supply terminal 43. Capacitor 69 connected between the collector of the phototransistor 45 and the base of the transistor 51 serves to high pass couple the received pulses to the multivibrator circuit and blocks the normal low-frequency ambient lighting components which could cause false triggering of the one-shot multivibrator. As long as the ambient light contribution is not sufficiently strong to saturate the light sensor, operation is not impaired, and under normal conditions of ambient lighting, optical light filtering is not required. The narrow intense fast rise light pulses produced by the light emitting diode 21 makes this possible.

In the operation of the one-shot multivibrator, the transistor 51 is normally biased on and thus transistor 53 is off. When the negative pulse from the light sensor 45 is received, NPN transistor 51 turns off thereby turning on transistor 53 since a biasing potential is now applied to its base. Feedback current from the collector of transistor 53 coupled to the base of transistor 51 by coupling capacitor 63 holds transistor 51 off for a time determined primarily by the time constant of the charging network comprising the resistor 55 and the capacitor 63. At the end of this time the base of transistor 51 again has a positive potential applied to it which forward biases the transistor 51, turning it on. Consequently, the transistor 53 now turns off and the circuit remains stable until another received pulse causes a new cycle of operation.

To detect when the train of light pulses is intercepted or broken by an intruder passing through the optical coupling between the transmitter and receiver units, a capacitor 71 is connected between ground and the junction between the resistors 65 and 67 in the collector circuit of the transistor 53. So long as the transmitted light pulses are received at the constant frequency rate and the multivibrator transistor 53 becomes intermittently conductive at the same rate, the potential on the capacitor 71 remains at a first low value. If, however, no pulses are received for a predetermined period of time, capacitor 71 charges toward +3 volts through charging resistor 67 and the potential on the capacitor 71 is then at a second value. The electrical control signal applied to an alarm circuit thus has two values, and is actuated only when the electrical control signal has the second value.

The alarm circuit comprises a relaxation oscillator 73 and a small electro-acoustical transducer such as a permanent magnet audio loudspeaker 75 having a voice coil 76. The relaxation oscillator 73 is substantially the same as the relaxation oscillator 19 in the transmitter unit (see FIG. 1) and corresponding components have been given corresponding primed numerals. A blocking diode 77 is added between the emitter of the transistor 23' and ground, and another blocking diode 79 is added having its anode connected to the junction between the resistor 33' and the collector of the transistor 31' and its cathode connected to one position of an on-off mechanical switch 81 whose movable contact blade is coupled to the junction between the charging resistor 67 and the capacitor 71. When the normally off switch 81 is placed in the on position, the relaxation oscillator 73 is continuously energized after the light pulses are first interrupted and the alarm will sound and continue sounding regardless of the return of transmitted light pulses. The relaxation oscillator 73 has component values such as to produce output pulses having a frequency in the region of about 200 c.p.s. or at an appropriate frequency which is near the resonant frequency of the loudspeaker 75 in order to assure maximum audio output for minimum input power. The voice coil 76 of the loudspeaker is connected between the collector of the transistor 31' and ground.

In the operation of the alarm circuit it is seen that when the light pulses are received at the constant frequency rate, the potential on the capacitor 71 is relatively low and is insufficient to forward bias the transistor 23' of the relaxation oscillator 73. However, when light pulses are not received for a period of time, the capacitor 71 charges up and the potential is at a higher value approaching +3 volts which is sufficient to turn on the transistor 23'. In this manner pulses are supplied to the speaker coil 76, sounding the alarm. For a typical set of component values in the FIG. 3 receiver circuit, the receiver unit standby current is about 0.5 milliamphere for a battery supply of 3 volts. For some applications, the output indicator may be an electro-optical device or a lamp.

The instrusion alarm according to the invention has several significant product advantages. There is reduced initial manufacturing cost since no transformers, rectifiers, or filters are required. The battery operation creates greater customer appeal since the product can be located without regard to available outlets or cords, has increased portability and requires no installation expense. There is increased reliability because the intrusion alarm will function regardless of AC power loss and there is no device wear-out, such as light bulbs. This assumes that the batteries are replaced before they are exhausted or are designed to be fail safe. The circuits use less power and operates much faster than conventional circuits in which the light pulses are produced by mechanically chopping light from a continuous light source such as a bulb. As has been mentioned, the low power requirements of the circuits permit long life battery powered operation and with minor changes may approach the shelf life of the batteries. New semiconductor components or techniques are likely to allow achieving lower power loss designs. For example, the PSIN type of light emitting diode is similar to a Shockley diode in that a potential across the device to fire it may be in the order of about 9 volts. To make a high efficiency relaxation oscillator, the PSIN diode can be connected in parallel with a charging capacitor which is in turn inductively charged from a low voltage battery source. Inductive charging is used rather than resistance charging in order to minimize the power requirements. Although these circuits and the following circuits use a 3 volt battery, circuits which operate on low energy batteries in the range of about 1.5 to 10 volts are feasible. Moreover, mercury batteries may be more desirable since they contain more energy.

Figure 4:
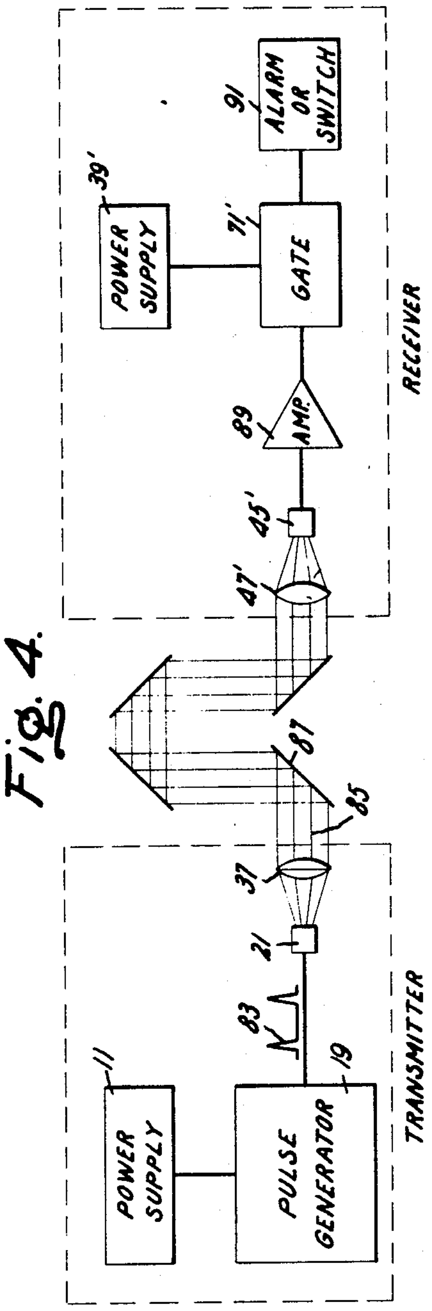
FIG. 4 is a block diagram showing the relationship of the main elements of a smoke detector device.
Figure 5:
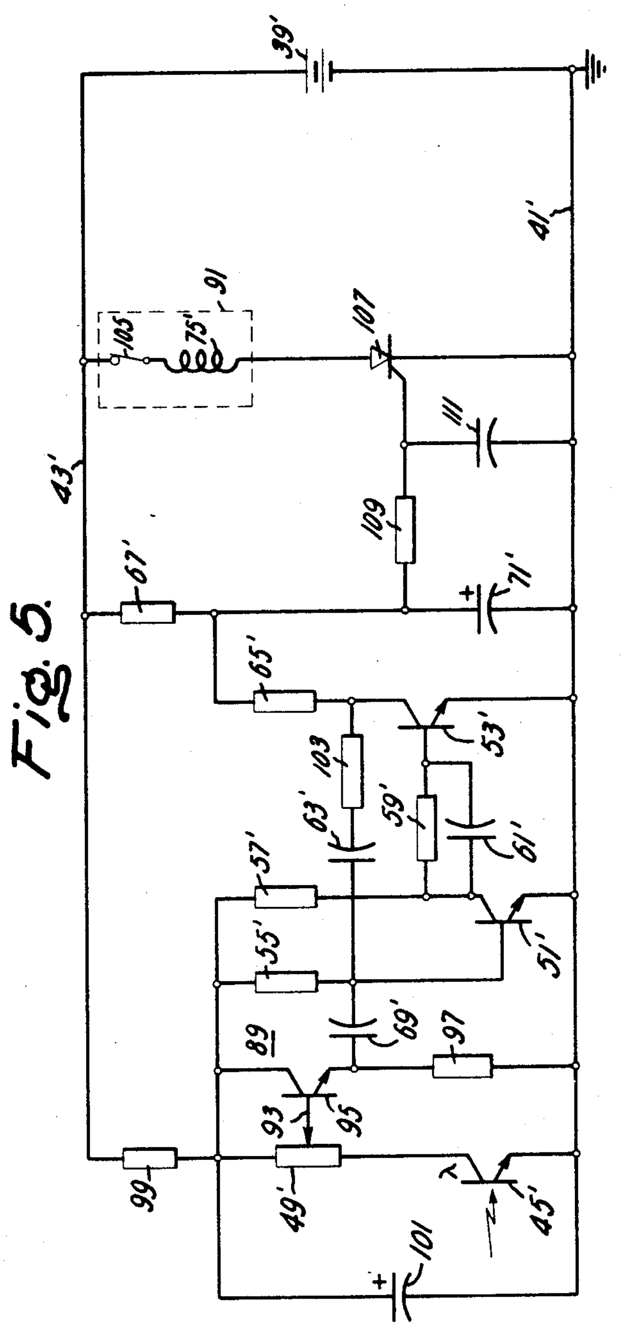
FIG. 5 is a schematic circuit diagram of the receiver unit of the smoke detector.

The application of these concepts to a smoke detector remote control apparatus is illustrated in FIGS. 4 and 5. The transmitter and receiver units of the intrusion alarm and the smoke detector are functionally identical, however, some changes are made in the receiver circuitry as will be pointed out. Referring to FIG. 4, the transmitter can be the same transmitter as is used for the intrusion alarm (see FIG. 1). In block diagram form it will be recognized that the transmitter comprises the low voltage battery supply 11 for operating the relaxation oscillator pulse generator 19 to produce a series of constant frequency electrical pulses 83 which are applied to the light emitting diode 21. The LED 21 is chosen to emit light in that portion of the spectrum most sensitive to transmission through smoke, and this is believed to be in the near-infrared region. The series of narrow intense light pulses developed in this manner are collected and focused by the lens 37 into a collimated beam 85. The transmitter and receiver are desirably mounted in a single housing, and to increase the length of path of the beam of light 85 through the atmosphere without making the housing unduly large, four small 45° mirrors 87 are placed as shown to deflect the beam 85 up, across, and then down and over into the lens 47′ associated with the light sensor 45′ in the receiver unit. A train of light pulses is sensed by the light sensor 45′ with the exception of when there is smoke in the air which blocks the transmission of the light pulses.

A modification of the receiver circuitry for the smoke detector, as compared to the receiver for the intrustion alarm (FIG. 3), is that the electrical pulses produced by the light sensor 45′ are preamplified in an amplifier 89 before being applied to the gate (the capacitor 71′) which detects when the transmitted light pulses have been intercepted in order to turn on the alarm or switch 91. In the smoke detector the alarm takes the form of a bicycle horn powered by a silicon controlled rectifier. The power supply 39′ is again a low voltage dry battery, preferably two series connected size D flashlight batteries.

In the receiver circuit shown in FIG. 5, components identical to those already described with regard to the receiver of the intrusion alarm (FIG. 3), wtih the possible exception of having a slightly different component value, are given corresponding primed numerals. Thus, the light sensor 45′ is for instance a planar silicon photodevice or phototransistor which produces a negative pulse when a light pulse is sensed. The resistor 49′ in the collector lead of the phototransistor 45′ is in this case, however, a potentiometer having an adjustable tap 93 coupled to the base of the transistor amplifier 89. The amplifier 89 comprises an NPN transistor 95 connected in the common collector configuration as an emitter follower with a grounded resistor 97 in its emitter lead and its collector electrode connected through a current limiting resistor 99 to the positive power supply terminal 43′. The resistor 49′ and the multivibrator resistors 55′ and 57′ are also connected through the resistor 99 to the positive power supply terminal. Also, a charging capacitor 101 is coupled between ground and the collector lead of the transistor 95. A received negative pulse derived when the phototransistor 45′ is light activated turns on the transistor 95 and produces a negative pulse at the emitter of the transistor 95 which is coupled through the coupling capacitor 69′ to the transistor 51′ of the one-shot multivibrator. The amplitude of the voltage pulse required to turn off transistor 51′ can be adjusted by setting the movable tap 93, and thus the sensitivity to smoke detection can be varied. Capacitor 101 and resistor 99 serve to filter and stabilize the receiver supply voltage.

As was explained previously, the transistor 51′ of the one-shot multivibrator is normally on and turns off when a light pulse is sensed and amplified. This turns on the normally off transistor 53′, which remains on to stretch the received pulse until the feedback action through the resistor 103 and timing capacitor 63′ to the base of the transistor 51′, which keeps the transistor 51′ off for a time determined primarily by resistor 55′ and capacitor 63′. Then transistor 51′ again turns on, thereby turning off the other transistor 53′. So long as the transmitted light pulses are sensed at the constant frequency rate, the voltage on the gating capacitor 71′ has a first value which is insufficient to energize the alarm circuit. However, when the presence of smoke prevents the transmitted light pulses from reaching the phototransistor 45′ and there is an absence of received pulses for a predetermined time, the capacitor 71′ charges through the charging resistor 67′ toward the full value of the positive supply terminal 43′, i.e., +3 volts. The voltage across the capacitor 71′ now is at a higher second value which energizes the alarm circuit.

The alarm is a 1.5 volt bicycle horn 91 comprising a coil 75′ and a diaphragm activated intermittent contact switch 105. The horn 91 is connected between the positive supply terminal 43′ and the anode of a silicon controlled rectifier 107. The cathode of the SCR 107 is connected to the grounded supply terminal 41′ while its gate electrode is coupled to the junction between a series connected charging resistor 109 and charging capacitor 111, this series combination being connected between the junction of the charging resistor 67′ and the gating capacitor 71′ and ground. When the gating capacitor 71′ is fully charged to the value of the positive supply terminal 43′, the capacitor 111 produces a gating signal to turn on the SCR 107. This energizes the voice coil 75′ sounding the horn 91. The SCR 107 is commutated off by the open switch 105 but is turned on for the next cycle of operation so long as the control signal from capacitor 71′ is at or near +3 volts, i.e., as long as there is smoke which blocks the light pulses from the transmitter. The horn alarm 91, by virtue of its higher Q diaphragm, is capable of greater acoustical output for a given amount of power as compared to the conventional loudspeaker used in the intrusion alarm, and this is especially true when operated at its resonant frequency.

The smoke detector receiver unit requires only about 3 milliamperes of current from a pair of size D flashlight dry cells, and thus has extremely low power requirements. Since the smoke detector is relatively small and can be contained in a single housing, it has the potential for wide application as a home type, over the counter appliance. It does not require installation, can provide many years of trouble-free service, and is relatively low cost assuming that the light emitting diode 21 and light sensor 45′ are available at low prices. The sensitivity of this battery-powered smoke detector is at least comparable to equivalent smoke detectors which use conventional filament light sources and are power line operated.

Figure 6:
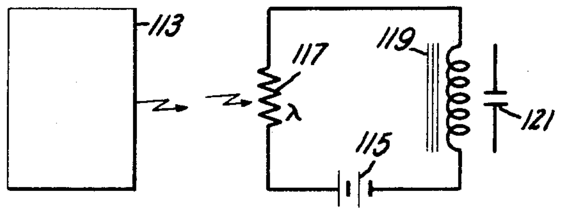
FIG. 6 is a schematic circuit diagram for a photoelectric relay.
Figure 7:
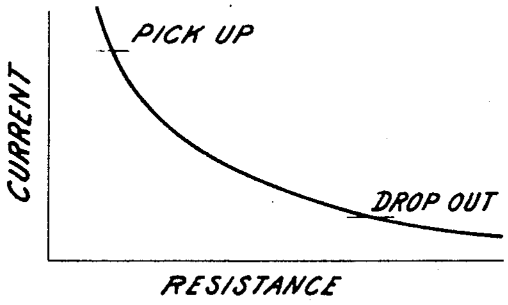
FIG. 7 is a curve of resistance versus current for a photoelectric relay.

The remote control system can be used to operate a photoelectric relay as illustrated in FIG. 6. A low voltage battery operated light transmitter 113 for producing a train of light pulses at a constant frequency rate can be the same as used in the intrusion alarm, see FIG. 1. The receiver is powered by low voltage dry cells 115 and is connected in series with a light sensing photoconductor 117 and the coil 119 of the photoelectric relay for actuating the contacts 121. The relation between the resistance of the photoconductor 117 and the current in the coil 119 is shown in FIG. 7, wherein it is seen that the contacts pick up when the resistance is low and hence the current is at a relatively high value, and drop out when the resistance is high and the current is at a low value. The photoconductor 117 is preferably a polycrystalline type which integrates the light pulses and avoids the need for a capacitor or the like for integrating the light pulses when a type of photoconductor which follows more faithfully each received pulse is used. When light pulses are received by the photoconductor 117 at the constant frequency rate, the resistance of the photoconductor is low and the contacts 121 are closed. But when the transmitted light pulses are intercepted in some manner, the resistance of the photoconductor 117 rises and the contacts 121 are opened which allows actuation of an output indicator such as an alarm or an indicator lamp. The circuit has a two-way time constant, since the resistance falls more rapidly when light is sensed than it rises after the light is taken away. This circuit is further inexpensively battery-operated and has low power requirements.

In the foregoing transmitter unit circuits, it has been described that the relaxation oscillator 19 produces pulses at a constant or substantially constant frequency rate for actuating the light emitting diode 21. Within the scope of the invention, the frequency rate of the electrical pulses may be varied in some cyclical or predictable manner, provided it is coordinated with the receiver sampling technique. Thus, the capacitors 71 and 71' in the receiver units of the intrusion alarm and smoke detector may be chosen such that the voltage level does not rise to the value sufficient to actuate the output indicator so long as a predetermined number of pulses are received within a predetermined period of time. Whether they are received at a constant rate or variable rate within this predetermined period of time is not material. Similarly, the photoconductor 117 in the photoelectric relay may be selected such that the current in the circuit stays above the level at which the contacts drop out when a predetermined number of light pulses are received within a predetermined period of time. That they are received at a varying rate within this period of time does not change the operation. In the broader sense, the pulses are generated by a suitable pulse forming circuit means at a substantially constant frequency rate when time averaged over a predetermined period of time which is related to the receiver characteristics. Moreover, the transmitter and receiver can both be turned off simultaneously for a desired length of time and power returned when it is desired to recommence the remote control operation. By contrast, it will be observed that in the light-operated cordless clock which follows, the timing of the pulses at an uninterrupted constant frequency is needed to assure accuracy of the clock.

Figure 8:
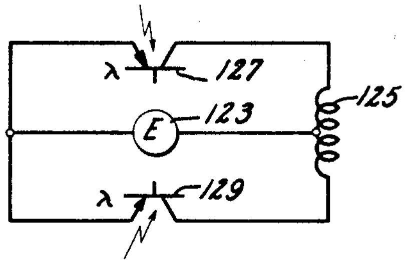
FIG. 8 is a schematic circuit diagram of a battery operated electric clock.

In FIG. 8 is shown a cordless clock which can be operated by light pulses from a light transmitter unit such as the transmitter 113 (FIG. 6). The light transmitter for this application is synchronized to the alternating power frequency and emits pulses at regular intervals at the rate of 120 pulses per second. A low voltage energizer 123 has one terminal connected to the center tap of a motor winding 125. One end of the winding 125 is connected through a phototransistor light sensor 127 to the other energizer terminal, and the other end of the winding 125 is connected to a similar phototransistor 129 which in turn is coupled to the other energizer terminal. The transmitted light pulses alternately turn on the phototransistors 127 and 129 to supply current to either half of the winding 125, cyclically in one direction and then in the other. Suitable means not here shown are provided to bias the phototransistors to achieve this operation. Since the light pulses produced by the transmitter are narrow and intense, the phototransistors 127 and 129 can be arranged to be insensitive to other background radiation such as radio frequency radiation, static electricity, ambient lighting conditions, etc. Several such cordless clocks can be operated from a single light transmitter unit properly placed in the room.

The remote control systems which have been mentioned, namely, the intrusion alarm, the smoke detector, the photoelectric relay, and the cordless clock are exemplary of the applications for which the general concept can be employed, and undoubtedly other applications utilizing the light coupled transmitter and receiver can be suggested. As has been demonstrated, low energy transmitters powered by available batteries or other low energy sources of electric potential are made possible by the combination of light emitting semiconductor devices operated in low duty pulse mode by pulse generator circuits having low power requirements. Receiver units utilizing light activated semiconductor sensors and similar pulse forming and alarm or control circuits are similarly powered by low energy batteries and are insensitive to extraneous noise due to the sharp pulse form emitted by the light emitting semiconductor devices. Although the light pulses occur at a substantially constant or constant frequency rate, the receiver response is possible in two modes of operation, namely, only for an absence of pulses or in response to each received light pulse, according to the requirements of the particular applications. For certain applications it will be appreciated that batteries or cells that convert nuclear, solar, or thermal energy, rather than chemical energy, into electrical energy may be employed as a power source, and in the broad sense any suitable low energy source of electric potential may be substituted for the battery or cell. For instance, a pulsed light transmitter used to provide communication with a satellite would undoubtedly have one of these other types of power sources.

While the invention has been particularly shown and described with reference to several preferred embodiments thereof, it will be understood by those skilled in the art that various other changes in form and details may be made therein without departing from the spirit and scope of the invention.

What we claim as new and desire to secure by Letters Patent of the United States is:

1. A battery operated solid state smoke detector comprising a light transmitter unit including a low voltage battery source and pulse forming circuit means having low energy requirements comprising a low duty cycle relaxation oscillator for generating a series of current pulses at a substantially constant rate, and a light emitting semiconductor diode coupled to the output of said pulse forming circuit means for producing a series of narrow intense light pulses at the substantially constant frequency rate, a light receiver unit also energized by a low voltage battery source and comprising a light activated semiconductor device optically coupled to said light emitting semiconductor diode for sensing the series of transmitted light pulses, a one-shot multivibrator that changes state each time a transmitted light pulse is sensed, a charging network comprising a series connected resistor and capacitor whose junction is coupled to the output of said one-shot multivibrator such that the voltage on the capacitor has one value when the one-shot multivibrator periodically changes state and discharges the capacitor and a second value when the optical coupling is broken and the capacitor charges to a second value due to failure of said one-shot multivibrator to change state for a predetermined period of time, an arrangement of mirrors between said transmitter and receiver units for increasing the path length of the transmitted light pulses, said transmitter and receiver units being only optically connected and having no galvanic connection, and an output indicator coupled to said transmitter unit that is actuated only by the second value capacitor voltage to indicate the presence of smoke which breaks the optical coupling between the transmitter and receiver units.

References Cited

UNITED STATES PATENTS

| | | | |
|---|---|---|---|
| 3,120,654 | 2/1964 | Lee | 340—258 |
| 2,185,361 | 1/1940 | Towne | 340—228 X |
| 2,202,060 | 5/1940 | Mitchell. | |
| 2,631,273 | 3/1953 | Bagno | 340—228 |
| 2,912,683 | 11/1959 | Bagno | 340—258 |
| 3,191,048 | 6/1965 | Cowen | 340—258 X |
| 3,293,513 | 12/1966 | Biard et al. | |
| 3,309,689 | 3/1967 | Keeney | 340—258 |
| 3,370,285 | 2/1968 | Cruse et al. | 340—258 |

THOMAS B. HABECKER, Primary Examiner

D. L. TRAFTON, Assistant Examiner

U.S. Cl. X.R.

250—199, 221, 214; 307—311; 340—258